Jan. 5, 1971 L. N. FEDOROFF 3,552,026
PRECISE ANGLE MEASURING DEVICE
Filed April 17, 1969 2 Sheets-Sheet 2
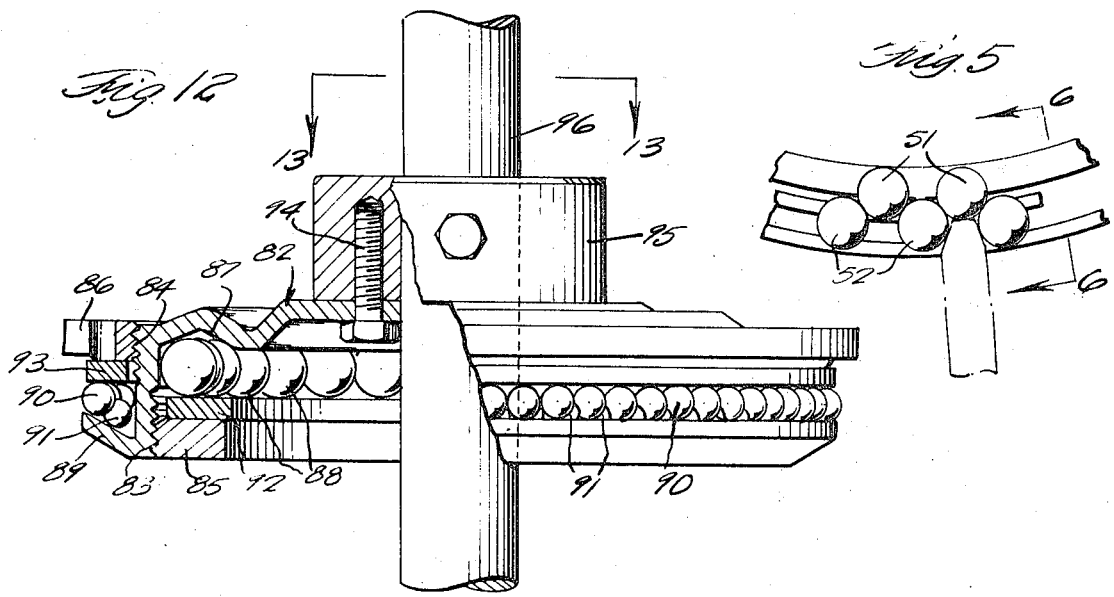
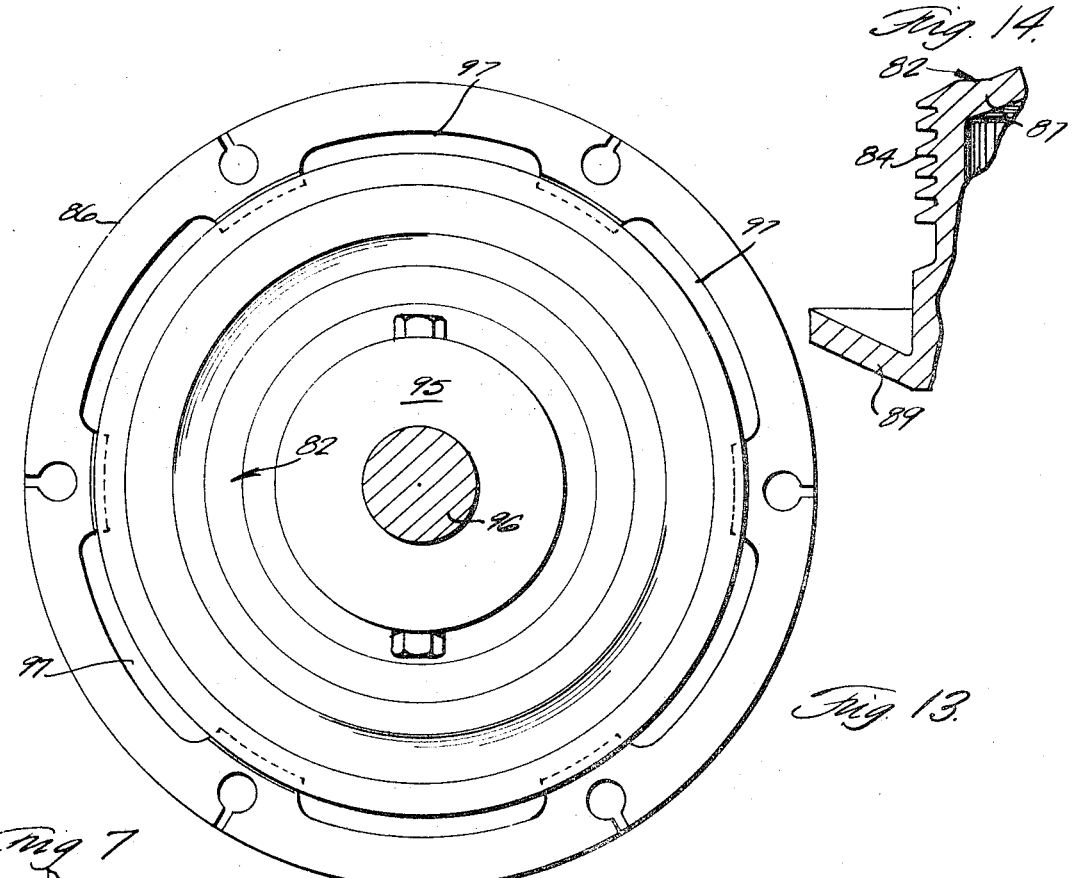
INVENTOR.
LEO N. FEDOROFF
BY
Victor J. Evans & Co.
ATTORNEYS United States Patent Office 3,552,026
Patented Jan. 5, 1971

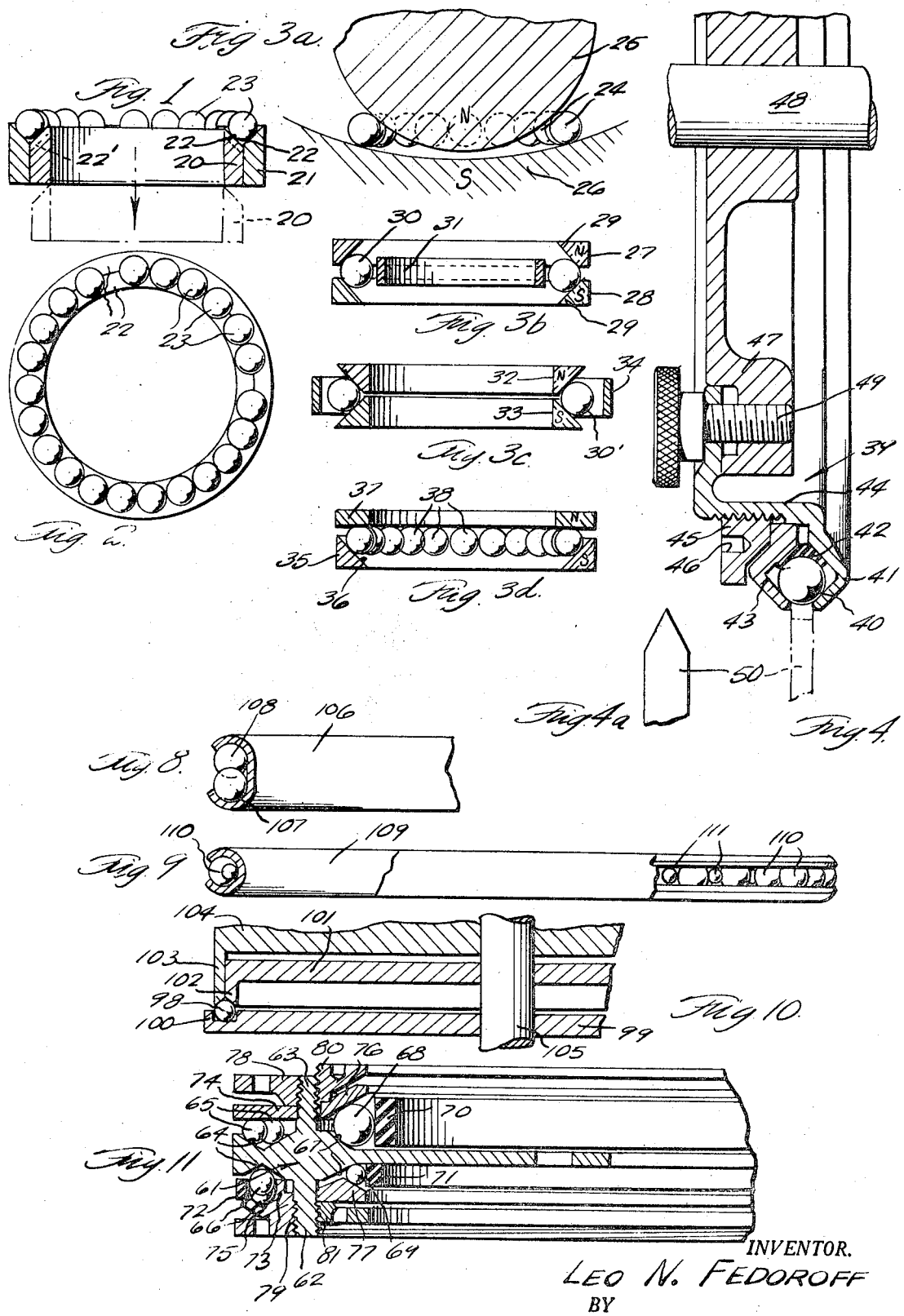

3,552,026
PRECISE ANGLE MEASURING DEVICE
Leo N. Fedoroff, 3446 Dunbar St., Vancouver,
British Columbia, Canada
Filed Apr. 17, 1969, Ser. No. 816,961
Int. Cl. B23f 23/08
U.S. Cl. 33—174
13 Claims

ABSTRACT OF THE DISCLOSURE

A diving head has a ring-shaped body portion with at least one annular seat portion with an array of hardened spheres therein. An opposing axially movable annular seat element contacts the spheres on their sides remote from the seat of the body portion. A nut in threaded engagement with the ring-shaped body portion and in frictional engagement with the annular seat element is tightened sufficiently to cause mutual contact of all of the spheres preventing any movement thereof. The spheres may then be used in cooperation with an indexing bar for precise angular measurement.

BACKGROUND OF THE INVENTION

So-called dividing heads and variable indexing devices employing arrays of contacting spheres are known in the prior art. These devices serve to divide a circle into angular increments with great precision and they have rather wide utility for indexing, machine layout work and drafting. Examples of the prior art are shown in United States Pats. 3,088,340 and 3,231,980.

The ultimate accuracy of the instrument depends upon a number of factors including the precision with which the spheres can be produced and the machining tolerances on coacting parts. The very close tolerances easily attainable with commercial steel bearing balls and plane steel discs are set forth in Pat. 3,231,980 and these close tolerances are no great problem in the fabrication of the dividing head. However, a difficulty experienced in the prior art resides in the mode of assembly and in the application of screws and other fasteners to ball retaining parts, causing unequal stresses and distortion of parts which can detract significantly from the ultimate accuracy of the instrument.

Accordingly, the objective of this invention is to greatly improve upon the prior art, particularly in the manner of securing the ball arrays in firm contacting relation without necessity for any prealignment of contacting parts and without human error intervening. The accuracy of the device is dependent only upon manufacturing tolerances. Additionally, the invention device is constructed more economically than broadly similar devices of the prior art, and embodies a higher degree of utility and versatility. Other features and advantages will be apparent during the course of the following description.

BRIEF DESCRIPTION OF THE DRAWINGS

FIG. 1 is a central vertical section through an embodiment of a measuring device or divider head embodying the invention.

FIG. 2 is a plan view of the structure in FIG. 1.

FIGS. 3a, 3b, 3c and 3d are central vertical cross sectional views showing alternate constructions and methods of producing contacting sphere arrays in accordance with the principles of the invention.

FIG. 4 is a fragmentary central vertical section through a complete measuring head embodying the invention and having a single annular array of spheres.

FIG. 4a is a right side elevation of the indexing bar used in connection with the device of FIG. 4.

FIG. 5 is a fragmentary plan view of a modification showing a double array of spheres.

FIG. 6 is a vertical section taken on line 6—6 of FIG. 5.

FIG. 7 is a cross sectional view similar to FIG. 6 showing another modification.

FIG. 8 is a fragmentary vertical section through a modified and economical form of the device employing a double array of spheres.

FIG. 9 is a side elevational view, partly in section, showing a modification of the construction in FIG. 8.

FIG. 10 is a fragmentary vertical section showing a further modification.

FIG. 11 is a similar view through a dividing head having differential measuring and indexing capabilites from both the interior and outer sides of the ring structure.

FIG. 12 is a fragmentary vertical section showing another modification.

FIG. 13 is a horizontal section taken on line 13—13 of FIG. 12.

FIG. 14 is an enlarged fragmentary vertical section through a threaded sphere retaining body.

DESCRIPTION OF THE PREFERRED EMBODIMENTS

Referring to the drawings in detail, wherein like numerals designate like parts, reference is made first to simplified FIGS. 1 to 3d inclusive which illustrate the principles upon which the more utilitarian embodiments of the invention are founded.

In FIG. 1, a pair of interfitting rings 20 and 21 have beveled diverging upper end faces 22 forming an annular V-shaped groove. The two rings slidably interfit and may move axially relative to each other. A plurality of steel spheres 23 are placed in the groove formed by the faces 22 and the annular groove is filled up with the spheres to the extent possible, although as a practical matter there will always be some gap or space between spheres when they are initially introduced into the groove with the rings 20 and 21 positioned as in FIG. 1.

By a slight lowering of the interior ring 20 relative to the ring 21, for example, to a position indicated at 22' in FIG. 1, the spheres 23 will gravitate on the inclined surfaces where they will contact and there will be no space between the annnular array of spheres. All contact points will be located on a circle inscribed in one plane and this circle will be divided into equal arcs by the spheres. When the spheres are thus brought into contact, the interior ring 20 can actually be withdrawn completely from the assembly and the spheres will be in a condition of balance due to mutual contact and contact with the remaining surface 22. The resulting structure may be used for measuring angles with precision but since the spheres 23 are easy to displace measurements are obtained by optical means only.

In FIG. 3a, substantially the same results are obtained by utilizing all spherical elements including an annular array of small measuring spheres 24, an upper large sphere 25 and a supporting concave spherical element 26. The several spheres 24 are in point contact with each other and with the elements 25 and 26 and a state of balance is again achieved. Gravity can be utilized to urge the spheres 24 toward a common center through the elements 25 and 26, or a component of magnetic attractive force may be employed as suggested by the North and South Pole designations on the elements 25 and 26.

To overcome the limitations of the structures in FIGS. 1 and 3a in that the spheres are easily displaced, the arrangements in FIGS. 3b, 3c and 3d can be utilized. In these schemes, the array of spheres are held in an annular seat or groove under pressure of an elastic ring and/or by magnetic forces. In FIG. 3b, opposed rings 27 and 28 having diverging conical faces 29 on a common center of revolution receive an array of spheres 30, as shown.

Initially, there will be some space between the spheres and the internal ring 31 will prevent the collapse of the array. The rings 27 and 28 are moved together axially and this movement will shift the spheres 30 into mutual contact so that each sphere will actually be held at four points, two of which are with the surfaces 29 and two with adjacent spheres. The ring 31 may now be discarded or removed. The practical embodiments shown in FIGS. 4 and 11, yet to be described, are founded upon the principle and mode of operation in FIGS. 3b and 3d primarily.

FIG. 3c is substantially the same as FIG. 3b with the exception of the fact that the spheres 30' are seated in an external annular groove formed by opposing relatively movable rings 32 and 33 with a surrounding temporary retaining band 34 which may be discarded after the spheres 30' are brought into mutual contact by axial separation of the rings 32 and 33.

FIG. 3d shows a slightly different arrangement employing a lower ring 35 having a conical face 36 and an upper flat ring 37 with an array of spheres 38 intervened therebetween, as shown. Gravity or magnetic forces will move the spheres into mutual contact as should now be clear in view of the foregoing descriptions.

The practical embodiment of the invention in FIG. 4 comprises a sphere retaining ring body 39 which is positioned horizontally during the assembly process and an array of spheres 40 are placed in an annular channel extension 41 formed integrally with ring body 39. An elastic annulus 42 backs up the interior sides of the spheres in the array. An opposed channel ring 43 is now slipped over the central wall 44 of ring body 39 and rests on the resilient annulus 42. A nut 45 having spanner wrench openings 46 is applied to threads on the wall 44 and tightened until the spheres 40 are in mutual contact and also in contact with the diverging channel faces of elements 41 and 43, at which time the elastic annulus 42 will be compressed. The proper clamping position is determined by sudden resistance to further tightening of the nut 45 and it is feasible and desirable to force the nut a small amount further beyond the point of initial resistance. The ring body 39 may be connected with a carrier disc 47 mounted on a shaft 48 by threaded fastener means 49 depending upon the intended use of the instrument for accurate indexing or the like. The numeral 50 designates a typical indexing bar or element which may engage between the channel elements 41 and 43 for contact with adjacent spheres 40 in the array. The compressed ring 42 helps to maintain the spheres 40 properly arrayed.

FIGS. 5 and 6 show a modification of the structure in FIG. 4 where a pair of annular arrays of spheres 51 and 52 are similarly held between the faces of opposing channel parts 53 and 54 corresponding to elements 41 and 43 in FIG. 4. The spheres are backed up by a compressible annulus 55 within the groove of one channel member, the member 53 in the FIG. 6 illustration. The remainder of the structure may correspond exactly to FIG. 4. As should be obvious, the employment of two sphere arrays enables measuring of angles in finer increments.

The structure in FIG. 7 is similar to FIG. 6 except that the arrays of spheres 56 and 57 are oppositely disposed with respect to channel elements 58 and 59 or positioned 90 degrees out of phase with the spheres 51 and 52 in FIG. 6. The spheres in FIG. 7 are also backed up at the inner sides of the arrays by a compressible ring 60. The advantage of the construction in FIG. 7 is that both rows or arrays of spheres are exposed to receive an indexing bar and the number of indexing increments or angle measuring increments is doubled.

Referring next to FIG. 11, a somewhat more sophisticated differential divider is shown comprising a ring body 61 having screw-threaded annular extensions 62 and 63. Radially outwardly of these extensions the ring body 61 has conical seats 64 for double arrays of spheres 65 and 66, as shown. Inwardly of extensions 62 and 63, the ring body 61 has conical annular faces 67 for additional single row arrays of spheres 68 and 69 of distinctly different sizes. Temporary resilient retainer rings 70 and 71 are employed while assembling the instrument for the reasons described in connection with FIGS. 3b and 3c. Similar temporary rings 72 and 73 are utilized in connection with the spheres 66 but are not needed with the spheres 65.

A flat annular backup ring 74 for the spheres 65 fits over the extension 63 and a channeled backup ring 75 for spheres 66 fits over the opposite extension 62. A like conical backup ring 76 for spheres 68 is received inwardly of extension 63 and a tapered seating ring 77 for spheres 69 engages inwardly of annular extension 62. An external nut 78 is threaded on extension 63 and presses flat ring 74 against spheres 65 until all spheres contact. A like external nut 79 on extension 62 urges ring 75 and spheres 66 into final contact. Internal nuts 80 and 81 have the same function in connection with the spheres 68 and 69 which will shift into contact in their arrays so that the temporary elastic retainer rings 70 and 71 may be removed.

The construction in FIG. 11 is highly versatile and allows differential angle measuring at the inside and outside of the annular structure. It will be noted that the construction of the instrument requires no bolts or screws or like fasteners which set up unequal stresses with resulting distortions of critical parts. A single ring body 61 serves to mount four different sets of spheres in conjunction with the large diameter nuts and associated clamping rings, above-described.

FIGS. 12 through 14 show a double divider head which is somewhat similar to the construction in FIG. 11. A ring body 82 having standard or buttress-type internal and external threads 83 and 84 receives internal and external nuts 85 and 86. The ring body has a groove seat 87 for inner array of relatively large spheres 88 and a conical flange 89 on the exterior of the ring body serves to seat arrays of smaller balls or spheres 90 and 91 arranged as shown. The spheres 88 are opposed by a flat ring 92 between them and the nut 85 and a like external ring 93 is intervened between the spheres 90 and nut 86. The divider head may, if desired, be attached as at 94 to a hub 95 which in turn may be secured to a shaft 96. The structure is somewhat simpler than that of FIG. 11 but is also versatile. As shown in FIG. 13, the large exterior nut 86 may be notched or undercut internally at 97 to reduce surface friction between the threads and to allow some spring action for the final seating of parts. The construction in this form of the invention is ideally suited for large size dividing heads containing large numbers of spheres.

Referring next to FIG. 10, an arrangement is shown for making an array of contacting spheres 98 on a flat disc 99 having an annular groove 100 in one face thereof. This groove is filled with spheres to the maximum possible extent but there will always be some space between spheres in the array. An upper interior disc 101 having a conically tapered flange 102 is arranged movably inside of a mating annular flange 103 on another upper disc 104, the two flanges 102 and 103 forming an annular V-shaped groove for the spheres 98. Axial pressure downwardly on the disc 104 will force the spheres 98 inwardly radially and raise the disc 101 along the axis of the shaft 105 which is common to the three elements 99, 101 and 104. All gaps between the spheres will close and the spheres will be in permanent contact.

If the groove 100 is prefilled with solder, epoxy resin or some like adhesive, the spheres 98 may become permanently locked to the disc 99 in contact relation in a perfect annular array and the elements 101, 104 and 105 may be removed and the structure may be employed much in the manner of the assembly in FIG. 3d.

When the invention is to be used in situations allowing wider tolerances, the construction may be further simplified as depicted in FIGS. 8 and 9 which are actually simplifications of the structures in FIGS. 7 and 6, respectively. In FIG. 8, a single housing ring 106 of C-shaped cross section is initially open sufficiently to allow the introduction of stacked sphere arrays 107 and 108. Subsequently, the housing ring is compressed closed in the axial direction and this causes the spheres to mutually contact very much in the same manner caused by tightening of nuts in the previous embodiments. The elements in FIG. 8 will then remain firmly in locked relation and the divider may be used for a variety of purposes. The arrangement may be reversed so that the open side of the housing ring will face radially inwardly to expose the spheres at such side.

ring 109 initially receives therein arrays of spheres 110

FIG. 9 shows a modification wherein the housing ring 109 initially receives therein arrays of spheres 110 and 111 and is finally clinched tightly around the ball arrays to produce contact among the balls or spheres and eliminate all gaps therebetween.

The broad utility of the invention will be readily apparent to anyone skilled in the art without the need for further explanation. The use of the various embodiments will correspond generally to the teachings in the mentioned Pats. 3,038,340 and 3,231,980.

The present invention is characterized by simplicity of assembly and construction without overstressing or distorting vital parts and is much more economical to manufacture than known prior art devices. It is also more precise in its ability to divide a circle or measure an angle, is easier to use, and is more versatile.

I claim:

1. A dividing head comprising a ring body having at least one annular seat for an array of spheres, an array of spheres engaging said annular seat of the ring body, an opposing axially movable annular seat element contacting the spheres on their sides remote from the annular seat of the ring body, and a gap closing nut having threaded engagement with the ring body and engaging said movable seat element and being operable to displace the movable seat element axially sufficiently to produce mutual contact of all of said spheres.

2. The structure of claim 1, wherein said annular seat is a groove.

3. The structure of claim 1, wherein said annular seat has a conical face contacting said spheres.

4. The structure of claim 1, wherein said annular seat and said opposing movable seat element contain opposing conical faces contacting said spheres.

5. The structure of claim 4, and a compressible annulus engaging said spheres continuously around the array of spheres and being between the array of spheres and at least one conical face.

6. The structure of claim 1, wherein said ring body has a conical seat for an array of spheres on opposite faces thereof and has oppositely axially extending screw-threaded extensions, opposing arrays of spheres engaging said seats, and opposing axially movable nut clamping means for the arrays of spheres having threaded engagement with said extensions.

7. The structure of claim 6, wherein said arrays of spheres consist of plural spheres of identical diameter in each array but with the spheres in one array differing in diameter from the spheres of the other array.

8. The structure of claim 1, and said ring body having a concentric pair of contoured seats on opposite sides thereof and annular axial threaded extensions between each concentric pair of seats, arrays of spheres contacting each seat of the ring body, clamping rings for the arrays of spheres and being axially shiftable relative to the ring body and closing nuts having threaded engagement with the extensions of the ring body axially outwardly of the clamping rings and in contact with the latter.

9. A dividing head comprising ring body means having at least an annular seat formed therein for an array of spheres, and cooperating relatively movable annular means engaging said spheres in the array and forcing the spheres into mutual contacting relationship while maintaining them in contact with the anular seat.

10. The structure of claim 9, wherein the ring body means contains a groove in one face thereof forming said seat and the relatively movable annular means is a pair of ring elements having opposing conical faces each engaging the spheres in said array, said ring elements being relatively movable axially.

11. The structure of claim 9, wherein the ring body means is a unitary distortable ring housing having an opening to receive the spheres making up said array, said ring housing adapted to be closed upon said spheres to force them into mutual contact.

12. The structure of claim 11, wherein the ring housing is substantially C-shaped in cross section to form opposing annular contoured seats, and opposing interfitting annular arrays of spheres engaging said seats and being in mutual contacting relation.

13. The structure of claim 9, and wherein the relatively movable annular means is a ring disposed inside of said ring body and being axially shiftable relative thereto, said ring body and ring having diverging annular faces on opposite ends thereof forming an adjustable annular seating groove, and an array of spheres within said groove brought into mutual contact by relative axial movement of said ring body and ring.

References Cited
UNITED STATES PATENTS

| | | | |
|---|---|---|---|
| 3,088,340 | 5/1963 | Shotey | 74—813 |
| 3,090,633 | 5/1963 | Farnsworth | 279—5 |
| 3,231,980 | 2/1966 | Lovins | 33—174 |

FRED C. MATTERN, Jr., Primary Examiner

F. D. SHOEMAKER, Assistant Examiner

U.S. Cl. X.R.

74—813, 826; 279—5